(12) United States Patent
Kamm et al.

(10) Patent No.: US 9,584,722 B2
(45) Date of Patent: Feb. 28, 2017

(54) ELECTRONIC DEVICE, METHOD FOR GENERATING AN IMAGE AND FILTER ARRANGEMENT WITH MULTI-LENS ARRAY AND COLOR FILTER ARRAY FOR RECONSTRUCTING IMAGE FROM PERSPECTIVE OF ONE GROUP OF PIXEL SENSORS

(71) Applicant: SONY CORPORATION, Tokyo (JP)

(72) Inventors: Markus Kamm, Karlsruhe (DE); Alexander Gatto, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/764,414

(22) PCT Filed: Feb. 10, 2014

(86) PCT No.: PCT/EP2014/000363
§ 371 (c)(1),
(2) Date: Jul. 29, 2015

(87) PCT Pub. No.: WO2014/124743
PCT Pub. Date: Aug. 21, 2014

(65) Prior Publication Data
US 2015/0365594 A1  Dec. 17, 2015

(30) Foreign Application Priority Data
Feb. 18, 2013  (EP) .................................... 13000813

(51) Int. Cl.
*H04N 9/09* (2006.01)
*H04N 5/232* (2006.01)
(Continued)

(52) U.S. Cl.
CPC ....... *H04N 5/23235* (2013.01); *G06T 7/0018* (2013.01); *H04N 5/2254* (2013.01);
(Continued)

(58) Field of Classification Search
CPC .................................................. H04N 5/23235
See application file for complete search history.

(56) References Cited

U.S. PATENT DOCUMENTS 6,611,289 B1  8/2003  Yu et al.
7,884,309 B2  2/2011  Olsen et al.
(Continued)

FOREIGN PATENT DOCUMENTS

EP  1677518 A1  7/2006
EP  2190019 A1  5/2010
(Continued)

OTHER PUBLICATIONS

"Iterative-Interpolation Super-Resolution Image Reconstruction," Vivek Bannore Springer-Verlag 2010, ISBN 978-3-642-10145-8, pages 50-76.
(Continued)

*Primary Examiner* — Gary C Vieaux
(74) *Attorney, Agent, or Firm* — Oblon, McClelland, Maier & Neustadt, L.L.P.

(57) ABSTRACT

An electronic device including: an image sensor including plural sensors divided into groups; a multi-lens array including plural lenses configured to each form an image of a scene on a distinct group of the groups of pixel sensors; and a filter including plural color filter elements arranged in rows and columns. Each color filter element is associated with one of the lenses and the respective distinct group and configured to filter an image of the scene into one of plural color channels. A first group of pixel sensors can define a perspective of the scene for an image reconstruction, and the color filter elements in the row of the color filter element corresponding to the first group and the color filter elements
(Continued)

in the column of the color filter element corresponding to the first group can filter the image of the scene into each of the plural color channels.

12 Claims, 4 Drawing Sheets

(51) Int. Cl.
  *H04N 9/07* (2006.01)
  *G06T 7/00* (2006.01)
  *H04N 5/225* (2006.01)
  *H04N 9/04* (2006.01)

(52) U.S. Cl.
  CPC ............... *H04N 9/045* (2013.01); *H04N 9/07* (2013.01); *G06T 2207/10024* (2013.01); *G06T 2207/10048* (2013.01); *G06T 2207/20024* (2013.01); *G06T 2207/20212* (2013.01); *G06T 2210/61* (2013.01)

(56) References Cited

U.S. PATENT DOCUMENTS

| | | | |
|---|---|---|---|
| 2005/0134699 A1* | 6/2005 | Nagashima | G02B 13/0055 348/218.1 |
| 2006/0054782 A1* | 3/2006 | Olsen | G02B 3/0062 250/208.1 |
| 2007/0014019 A1 | 1/2007 | Mouli | |
| 2010/0128152 A1 | 5/2010 | Hayasaka et al. | |
| 2011/0080487 A1* | 4/2011 | Venkataraman | H04N 5/2253 348/218.1 |
| 2011/0122308 A1 | 5/2011 | Duparre | |
| 2011/0141309 A1 | 6/2011 | Nagashima et al. | |
| 2012/0176506 A1 | 7/2012 | Tajiri | |
| 2013/0308197 A1 | 11/2013 | Duparre | |
| 2015/0116562 A1* | 4/2015 | Wan | H04N 5/2254 348/302 |

FOREIGN PATENT DOCUMENTS

| | | |
|---|---|---|
| EP | 2475162 A2 | 7/2012 |
| JP | 2012-80363 A | 4/2012 |
| WO | 00/07365 A1 | 2/2000 |
| WO | 2000/07365 A1 | 2/2000 |
| WO | 2011/063347 A2 | 5/2011 |
| WO | 2012/161225 A1 | 11/2012 |

OTHER PUBLICATIONS

International Search Report issued Jun. 23, 2014 in PCT/EP2014/000363 filed Feb. 10, 2014.

* cited by examiner

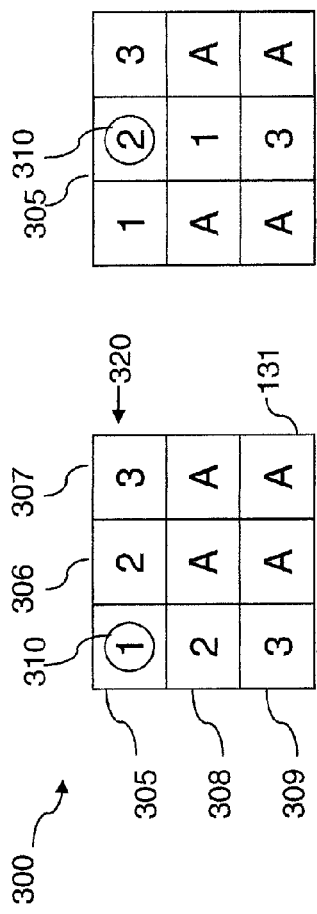

ELECTRONIC DEVICE, METHOD FOR GENERATING AN IMAGE AND FILTER ARRANGEMENT WITH MULTI-LENS ARRAY AND COLOR FILTER ARRAY FOR RECONSTRUCTING IMAGE FROM PERSPECTIVE OF ONE GROUP OF PIXEL SENSORS

BACKGROUND

Field of the Disclosure

The present disclosure relates to an electronic device including an image sensor including a plurality of pixel sensors divided into groups, a multi-lens array including a plurality of lenses, the lenses being adapted to each form an image of a scene on a distinct group of the groups of pixel sensors and a filter arrangement, a method for generating an image and a filter arrangement.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Mobile electronic devices, for instance cellular phones, currently are often equipped with image sensors in order to take photos and/or videos of interesting scenes. In order to reduce the dimensions of such electronic devices further, multi lens arrays (MLA) are used in order to form an image of a scene on an electronic image sensor including a plurality of pixel sensors, since those MLA systems have a smaller height than systems with a single lens or objective.

There is a need for further improving the generation of color images using MLA systems.

SUMMARY

An electronic device is provided comprising an image sensor including a plurality of pixel sensors divided into groups; a multi-lens array including a plurality of lenses, the lenses being adapted to each form an image of a scene on a distinct group of the groups of pixel sensors; and a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of the scene into each of the plurality of color channels.

Further, a method for generating an image is provided, comprising generating a plurality of images of a scene with an electronic device, the electronic device comprising an image sensor including a plurality of pixel sensors divided into groups; a multi-lens array including a plurality of lenses, the lenses being adapted to each form an image of a scene on a distinct group of the groups of pixel sensors; and a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of, the scene into each of the plurality of color channels; and generating a combined image of the scene with the perspective of the first group of pixels based on the images in the groups of pixels.

In addition, a filter arrangement is provided including a plurality of color filter elements arranged in rows and columns of a matrix, each color filter element being associated with one of a plurality of lenses of a multi-lens array and one of a plurality of groups of pixels of an image sensor, each color filter element being adapted to filter an image of a scene into one of a plurality of color channels, wherein the color filter elements in the row of the color filter element associated with a first group of pixels and the color filter elements in the column of the color filter element associated with the first group of pixels are adapted to filter the image of the scene into each of the plurality of color channels.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A and 3B show schematically filter arrangements according to embodiments of the disclosure for three color channels.

FIGS. 4A and 4B illustrate schematically filter arrangements according to further embodiments of the disclosure for four color channels.

DESCRIPTION OF THE EMBODIMENTS

Figure 1:
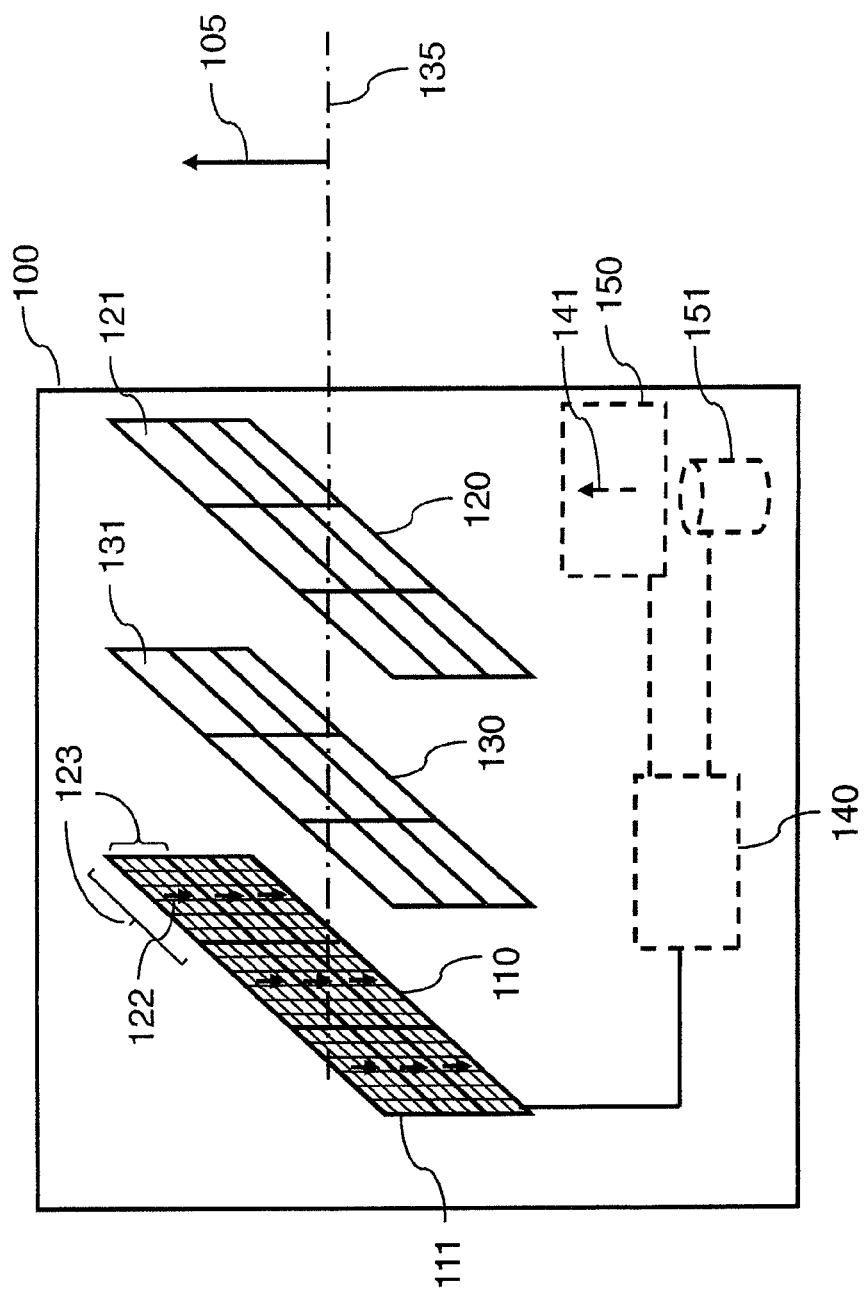
FIG. 1 shows a schematic diagram of an electronic device according to an embodiment of the disclosure.

Referring now to the drawings, wherein like reference numerals designate identical or corresponding parts throughout the several views, FIG. 1 shows a schematic diagram of an electronic device 100 including an imaging functionality. The electronic device 100 might be realized as a cellular phone, a smartphone, a tablet personal computer, a personal digital assistant (PDA), a webcam, a digital still camera, a digital video camera or any other similar electronic device, which might be used by a user for taking photos and/or videos of an object 105. In the following the term "image" will be used both for "photos" and "videos".

The electronic device 100 includes an image sensor 110 with a plurality of pixel sensors 111 arranged in a matrix. In current image sensors 110 the number of pixel sensors 111 might be around 16.1 million (16.1 Megapixel) or even up to 41 million. Future technical improvements might result in even larger number of pixel sensors 111 per image sensor 110.

The electronic device 100 further includes a multi lens array (MLA) 120 with a plurality of lenses 121 each adapted to generate an image 122 on a group 123 of the plurality of pixel sensors 111. The lenses 121 are arranged in a matrix form in the multi lens array (MLA) 120 resulting in a corresponding matrix form of a plurality of distinct groups 123 of pixel sensors 111 in the image sensor 110. Hence, instead of a single image that would be produced by a single lens, a plurality of images 122 equal to the number of lenses 121 in the MLA 120 but with a lower resolution than with a single lens is generated. Further, the MLA 120 has a lower height than a single lens; hence, it is easier to integrate in the electronic device 100.

A filter arrangement 130 is located in the electronic device 100. The filter arrangement 130 includes a plurality of color filter elements 131 arranged in rows and columns of a matrix, each color filter element 131 being associated with one of the lenses 121 and the respective distinct group 123 and each color filter element 131 being adapted to filter an image of the scene or object 105 into one of a plurality of color channels.

Since the color filter elements 131 are associated with the respective distinct group of pixel sensors, so that all pixel sensors of the distinct group detect image information of the same color, there are no missing details as e.g. when using a pixel-wise filter arrangement as, for instance, a Bayer pattern filter arrangement (2 green filters, one blue filter and one red filter in a 2×2 pixel matrix) with different color information for adjacent pixel sensors. With the pixel-wise filter arrangement it is possible that for certain parts of the scene only some of the color channels are available, since the arrangement of the filters might prevent that other color channels are detected for those parts. For instance, a certain part of the scene might in all images of the lenses always be imaged to a pixel sensor having a red filter. Then the green and blue information for this part of the scene is missing.

The color filter elements 131 might be associated to the lenses 121 in a 1:1 relationship.

Optionally, the electronic device 100 includes a processor 140 adapted to generate a combined image from the images 122 of the groups 123 of pixel sensors 111. It is possible however, that the processor 140 is not included in the electronic device 100, but is provided externally instead. In this case raw pixel data has to be transferred from the image sensor 110 to the external processor in order to generate the combined image.

If the processor 140 is provided within the electronic device 100 the combined image 141 might be displayed on an optional screen 150 or stored in a memory 151. The memory 151 might be a memory card, a memory stick, a hard disk, a floppy disk, a solid state memory or any other memory that can be electrically connected to the processor 140.

Figure 2:
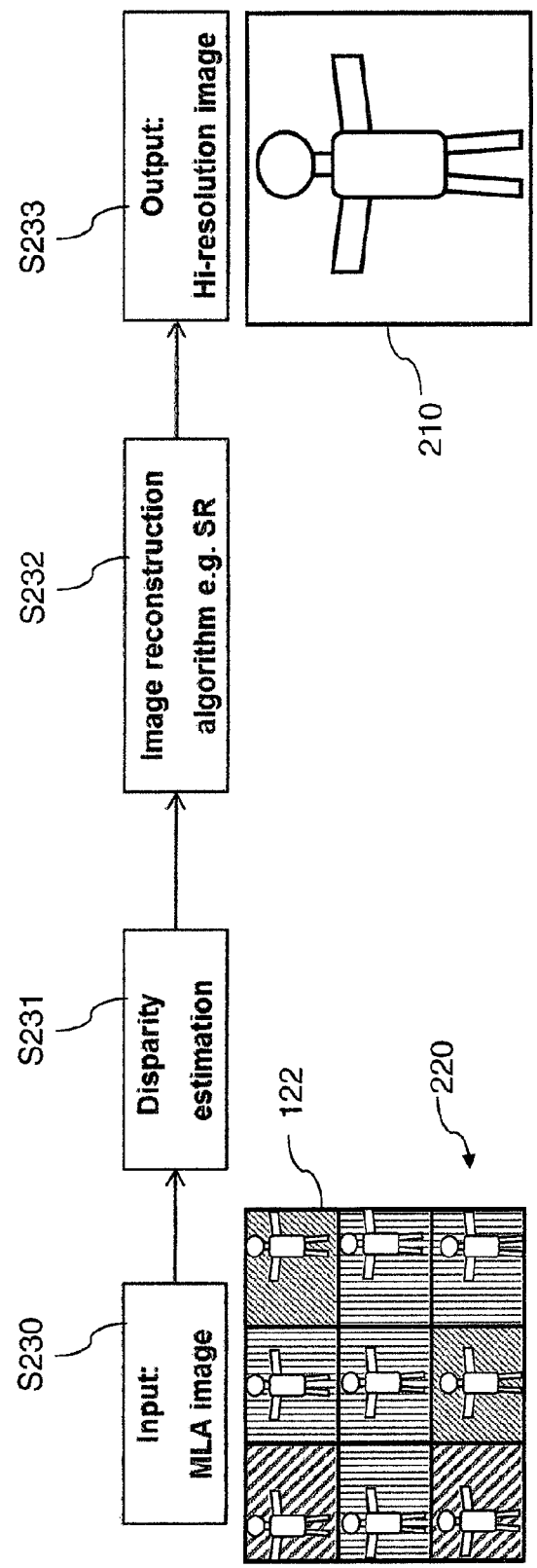
FIG. 2 shows schematically steps for generating a high resolution image from an input MLA image.

In FIG. 2 a schematic block diagram for generating a combined image 210 from an input MLA image 220 is depicted. In this example the MLA image 210 includes nine images 122 arranged in a matrix. In order to obtain color information of the depicted scene, each of the nine images 122 comprises data of one color channel resulting from the color filter elements 131 of the filter arrangement 130. Due to the different locations of the individual lenses 121 in the multi lens array 120, the images 122 are shifted with respect to each other and show slightly different viewing angles of the object 105.

After the MLA image 210 is input in S230, a disparity of the images 122 due to the shifting and different viewing angles is estimated and taken into account when a combined image 210 is generated or reconstructed with an image reconstruction algorithm, e.g. a super resolution algorithm SR, in S232. Afterwards the combined image 210 is output in S233, e.g. on the screen 150 or stored in the memory 151. SR algorithms are disclosed e.g. in the textbook "Iterative-Interpolation Super-Resolution Image Reconstruction" from Vivek Bannore, Springer-Verlag 2010, ISBN 978-3-642-10145-8.

Due to the shifting and different viewing angles of the images a first group of the groups 123 of pixel sensors 111 is selected, which defines a perspective of the scene or object for the image reconstruction.

In FIG. 3A a filter arrangement 300 according to an embodiment of the disclosure is depicted. The filter arrangement 300 shows color filter elements 131 arranged in a matrix with 3 columns and 3 rows used in a three color channel embodiment. The numbers depicted in the color filter elements 131 symbolize the three different colors of the color channels, e.g. in this embodiment 1=red, 2=green, 3=blue. The circle 310 indicates the color filter element 305 that is associated with the first group of pixel sensors that is used for defining the perspective of the combined image.

According to the embodiment depicted in FIG. 3A the color filter elements in row 320 including the color filter element 305 corresponding to the first group and the color filter elements in the column 321 including the color filter element 305 corresponding to said first group are adapted to filter the image of the scene into each of the plurality of color channels. Since in the depicted embodiment the color filter element 305 is a red color filter element in the depicted embodiment the color filter elements 306, 307 of the row 320 are green and blue color filter elements, and the color filter elements 308, 309 of the column 321 are also green and blue color filter elements. The further four color filter elements in the 3×3 matrix can be chosen arbitrarily (i.e. in this embodiment red, green or blue), which is exemplarily depicted by the letter "A".

When using the filter arrangement 300 according to the depicted embodiment, it is possible to avoid color artifacts due to occlusion of objects in the imaged scene. When an object is occluded by a further object that is closer to the multi lens array, the arrangement of the color filter elements according to the embodiments of the disclosure ensures that the generation of the combined image includes the color information of all color channels for all pixels of the combined image.

A further embodiment for a three color channel system is depicted in FIG. 3B. In this embodiment the color filter element 305 associated with the first group of pixel sensors 111 used for the perspective of the combined image is green (=2). Hence, the other two color filter elements in the same row and the same column are red (=1) and blue (=3).

Therefore, in order to suppress color artifacts due to occlusion during the image reconstruction all different color filter elements for the plurality of color channels are present within the row and the column of the color filter element associated with the first group of pixel sensors used as perspective for generating the combined image.

In FIGS. 4A and 4B further embodiments 400, 401 are depicted. Here, a four color channel system is used with a fourth color, e.g. infrared (=4). Also in those embodiments, in the row and in the column with the color filter element 305 associated with the first group of pixels sensors used for the perspective of the combined image, the other color filter elements for forming each of the four color channels are present.

It should be noted, however, that in matrices with a larger number of columns and/or rows, it is possible to ensure that all different color filter elements are present in the column and the row of the color filter element 305 associated with the first group of pixel sensors and that further, remaining, color filter elements could be chosen arbitrarily.

Figure 5A:
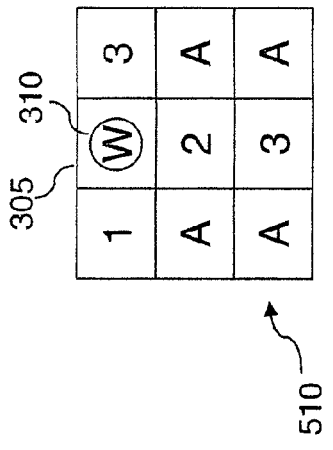
FIGS. 5A and 5B show schematically filter arrangement according to further embodiments including a white color channel.
Figure 5B:
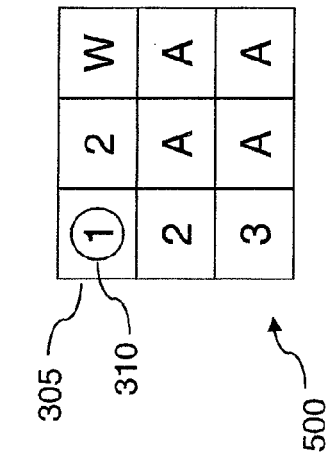

According to further embodiments for the filter arrangement 500, 510 depicted in FIGS. 5A and 5B, it is also possible to use a "white" color filter element (=W) or luminance filter. The filtered signal of white color filter (=W) is, for instance, correlated to signals of a red (=R), green (=G) and blue (=B) color filter by equation (1):

$$W = \gamma(R+G+B) \quad (1)$$

wherein $\gamma$ is a factor that is depending from a uniform spectral attenuation by the white color filter element and can be determined during characterization of the white color filter element, i.e. before the complete filter arrangement including the white color filter element is manufactured. Hence, the determined value of $\gamma$ can be used, e.g. by processor 140 to evaluate equation (1) in order to determine a missing color signal.

When the white color filter element W is used as it is depicted in FIGS. 5a and 5b, the missing color signal for knowing all color channels can be determined based on equation (1).

Since the white color filter element W allows detection of all colors in the associated group of pixel sensors 111, more light is gathered than when using a blue, red, green or infrared color filter. This results in a higher dynamic range and a better signal to noise ratio (SNR) and—due to the used super resolution SR algorithm also in a higher resolution of the combined image 210.

The filter arrangement 130 might be located—as depicted in FIG. 1—on an optical axis 135 between the image sensor 110 and the MLA 120. Nevertheless, it is equally possible that the filter arrangement 130 is located between the scene and the MLA 120.

Further, it is also possible that the filter arrangement is located in direct mechanical contact with e.g. the image sensor 110 or the multi lens array 120. When in direct mechanical contact with the multi lens array 120 it might be located on the side of the multi lens array 120 directed towards the image sensor 110 or on the side of the multi lens array directed towards the scene. The direct mechanical contact would result in an easier optical adjustment of the filter arrangement with the MLA 120 and/or the image sensor 110 and could be achieved by laminating or coating the color filter elements on the material (e.g. glass or plastic) of the lenses 121.

In a further embodiment, the filter arrangement might be realized by incorporating corresponding filter dyes into the material of the lenses 121 (e.g. glass or plastic) so that the multi lens array 120 acts simultaneously as filter arrangement and as focusing element for forming the images on the image sensor 110.

Figure 6:
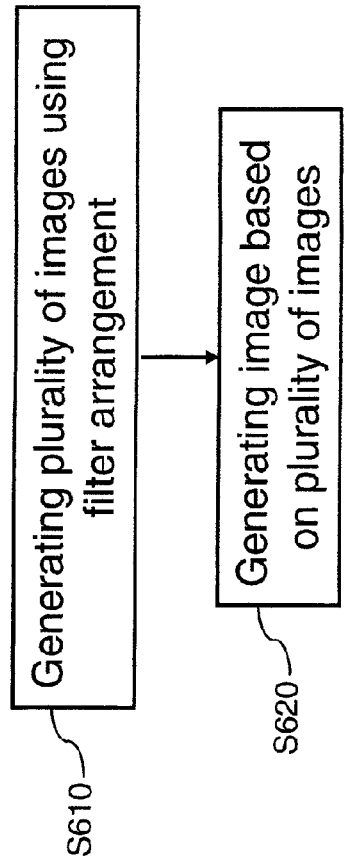
FIG. 6 shows schematically a flow diagram of a method according to an embodiment of the disclosure.

In FIG. 6 a flow diagram of a method according to an embodiment of the disclosure is depicted. In S610 a plurality of images is generated with an electronic device, the electronic device comprising an image sensor including a plurality of pixel sensors divided into groups; a multi-lens array including a plurality of lenses, the lenses being adapted to each form an image of a scene on a distinct group of the groups of pixel sensors; and a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of the scene into each of the plurality of color channels.

Then in S620 a combined image is generated based on the plurality of images.

With the proposed electronic device, method and filter arrangement it is possible to avoid color artifacts in reconstructed images based on occluded objects when using multi lens arrays.

Obviously, numerous modifications and variations of the present disclosure are possible in light of the above teachings. It is therefore to be understood that within the scope of the appended claims, the disclosure may be practiced otherwise than as specifically described herein.

The present technology is also in the following structures:
(1) Electronic device including
  an image sensor including a plurality of pixel sensors divided into groups;
  a multi-lens array including a plurality of lenses, the lenses being adapted to each form an image of a scene on a distinct group of the groups of pixel sensors; and
  a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of the scene into each of the plurality of color channels.
(2) Electronic device according to (1) further including:
  a processor connected to the image sensor and adapted to generate a combined image of the scene with a perspective based on the first group.
(3) Electronic device according to any one of (1) or (2), wherein the plurality of color channels includes white.
(4) Electronic device according to any one of (1) to (3), wherein the plurality of color channels includes red, green and/or blue.
(5) Electronic device according to any one of (1) to (4), wherein the plurality of color channels includes infrared.
(6) Electronic device according to any one of (1) to (5), wherein the filter arrangement is located on an optical axis between the image sensor and the multi lens array or between the multi lens array and the scene.

(7) Electronic device according to any one of (1) to (6), wherein the filter arrangement is in direct mechanical contact with the multi lens array.

(8) Electronic device according to any one of (1) to (5), wherein the filter arrangement is realized by incorporating dyes into the lenses of the multi lens array.

(9) Electronic device according to any one of claims (1) to (6), wherein the filter arrangement is in direct mechanical contact with the image sensor.

(10) Method for generating an image including:
generating a plurality of images of a scene with an electronic device, the electronic device comprising an image sensor including a plurality of pixel sensors divided into groups; a multi-lens array including a plurality of lenses, the lenses being adapted to each form an image of a scene on a distinct group of the groups of pixel sensors; and a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of the scene into each of the plurality of color channels; and
generating a combined image of the scene with the perspective of the first group of pixels based on the images in the groups of pixels.

(11) Method according to (10), wherein the plurality of color channels includes white.

(12) Method according to any one of (10) or (11), wherein the plurality of color channels includes red, green and/or blue.

(13) Method according to any one of (10) to (12), wherein the plurality of color channels includes infrared.

(14) Filter arrangement including
a plurality of color filter elements arranged in rows and columns of a matrix, each color filter element being associated with one of a plurality of lenses of a multi-lens array and one of a plurality of groups of pixels of an image sensor, each color filter element being adapted to filter an image of a scene into one of a plurality of color channels, wherein the color filter elements in the row of the color filter element associated with a first group of pixels and the color filter elements in the column of the color filter element associated with the first group of pixels are adapted to filter the image of the scene into each of the plurality of color channels.

The invention claimed is:

1. An electronic device comprising:
an image sensor including a plurality of pixel sensors divided into groups;
a multi-lens array including a plurality of lenses, the lenses being adapted to each form an image of a scene on a distinct group of the groups of pixel sensors;
a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of the scene into each of the plurality of color channels; and
circuitry connected to the image sensor and adapted to generate a combined image of the scene with the perspective defined by the first group by estimating a disparity of image data of the groups of pixel sensors relative to the perspective defined by the first group.

2. The electronic device according to claim 1, wherein the plurality of color channels includes white.

3. The electronic device according to claim 1, wherein the plurality of color channels includes red, green and/or blue.

4. The electronic device according to claim 1, wherein the plurality of color channels includes infrared.

5. The electronic device according to claim 1, wherein filter arrangement is located on an optical axis between the image sensor and the multi lens array or between the multi lens array and the scene.

6. The electronic device according to claim 1, wherein the filter arrangement is in direct mechanical contact with the multi lens array.

7. The electronic device according to claim 1, wherein the filter arrangement is realized by incorporating dyes into the lenses of the multi lens array.

8. The electronic device according to claim 1, wherein the filter arrangement is in direct mechanical contact with the image sensor.

9. A method for generating an image, the method comprising:
generating a plurality of images of a scene with an electronic device, the electronic device comprising an image sensor including a plurality of pixel sensors divided into groups; a multi-lens array including a plurality of lenses, the lenses being adapted to each form an image of a scene on a distinct group of the groups of pixel sensors; and a filter arrangement, wherein the filter arrangement includes a plurality of color filter elements arranged in rows and columns of a matrix, each color filter element being associated with one of the lenses and the respective distinct group and each color filter element being adapted to filter an image of the scene into one of a plurality of color channels, wherein a first group of the groups of pixel sensors is adapted to define a perspective of the scene for an image reconstruction, and wherein the color filter elements in the row of the color filter element corresponding to said first group and the color filter elements in the column of the color filter element corresponding to said first group are adapted to filter the image of the scene into each of the plurality of color channels; and
generating a combined image of the scene with the perspective of the first group of pixels based on the images in the groups of pixels by estimating a disparity of image data of the images in the groups of pixels relative to the perspective defined by the first group of pixels.

10. The method according to claim 9, wherein the plurality of color channels includes white.

11. The method according to claim 9, wherein the plurality of color channels includes red, green and/or blue.

12. The method according to claim 9, wherein the plurality of color channels includes infrared.

* * * * *